Jan. 15, 1924.　　　　　　　　　　　　　　　　　　1,481,088
T. FUJIYAMA
APPARATUS FOR AND PROCESS OF MANUFACTURING NITROGEN COMPOUNDS FROM CARBIDES
Filed Dec. 12, 1918
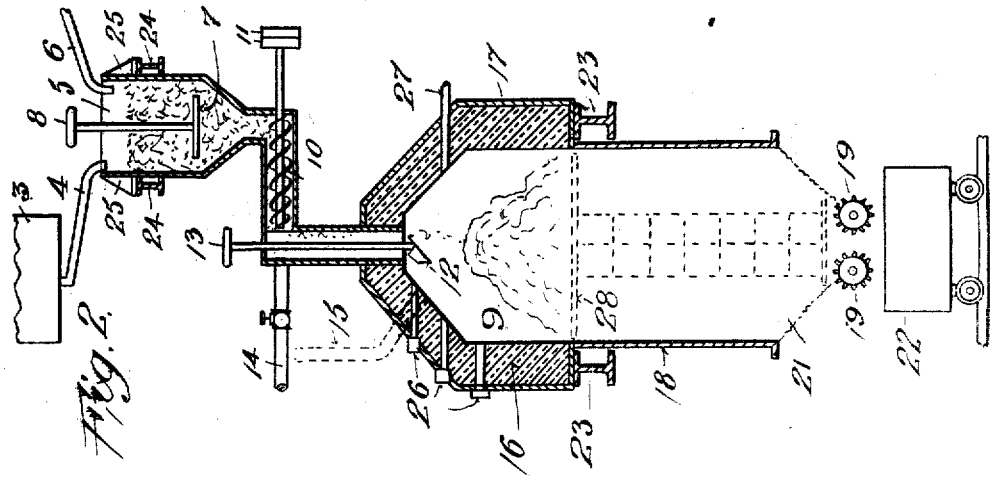
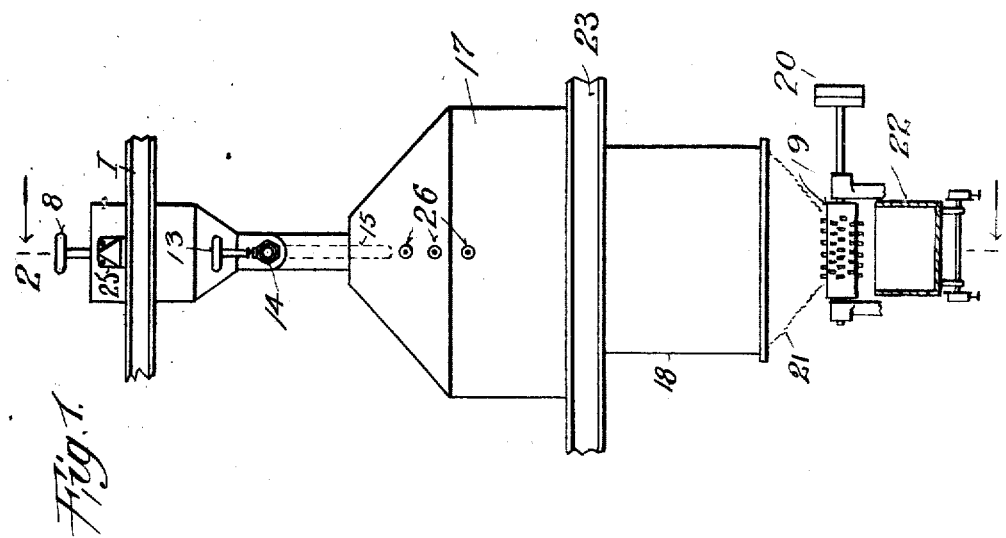
INVENTOR
Tsuneichi Fujiyama
BY
Samuel Derby
ATTORNEY Patented Jan. 15, 1924.

1,481,088

UNITED STATES PATENT OFFICE.

TSUNEICHI FUJIYAMA, OF TOKYO, JAPAN.

APPARATUS FOR AND PROCESS OF MANUFACTURING NITROGEN COMPOUNDS FROM CARBIDES.

Application filed December 12, 1918. Serial No. 266,421.

*To all whom it may concern:*

Be it known that I, TSUNEICHI FUJIYAMA, a subject of the Emperor of Japan, residing at No. 116 Rokuchome, Aoyama-Minami-machi, Akasaka-ku, Tokyo, Japan, have made a certain new and useful Invention in Apparatus for and Processes of Manufacturing Nitrogen Compounds from Carbides, of which the following is a specification.

This invention relates to the manufacture of nitrogen compounds and the object is to provide an apparatus for and process of manufacturing nitrogen compounds from carbides which is simple, economical, and in which the manufacture of nitrogen compounds may be accomplished continuously and without the application of external heat, electrical or otherwise.

A further object of the invention is to provide an apparatus and process of the nature referred to wherein the heat required for the manufacture of nitrogen compounds is derived from the chemical reaction which takes place in the body of the material under treatment in accordance with the process set forth, described and claimed in my Patent No. 1,126,000, granted January 26, 1915.

A further object of the invention is to provide an apparatus for and process of manufacturing nitrogen compounds at low cost and of good quality.

Other objects of the invention will appear more fully hereinafter.

The invention consists substantially in the construction, combination, location, arrangement and mode of procedure, all as will be more fully hereinafter set forth, as shown in the accompanying drawing, and finally pointed out in the appended claims.

Referring to the accompanying drawing:—

Fig. 1 is a view in side elevation showing an apparatus embodying my invention adapted for use in practicing the process.

Fig. 2 is a view in central vertical section of the reaction chamber.

The same part is designated by the same reference sign wherever it occurs throughout the several views.

In carrying out my invention pulverized carbide is introduced preferably without contact with the outer air, into a closed receptacle or bin, precautions being preferably taken to exclude atmospheric air from the interior of the bin. From the bin the pulverized carbide is delivered into a reaction chamber, to which chamber is also supplied nitrogen gas. In order to initiate the reaction the pulverized carbide after being introduced into the reaction chamber is ignited, air or oxygen being supplied for this purpose. After the ignited carbide has attained a suitable and proper reaction temperature the supply of air or oxygen is shut off and fresh quantities of carbide and nitrogen gas are supplied to the reaction chamber. The chemical reaction which takes place between the carbide and the nitrogen generates heat within the body of the carbide mass, the carbide absorbing the nitrogen, and eventually producing the desired nitrogen compound. The heat from this chemical reaction is sufficient to accomplish the production of the nitrogen compound without the necessity for applying external, electrical or other heat. By progressing the nitrogen compound produced continuously through the reaction chamber, and supplying fresh quantities of crushed carbide, the action becomes continuous, the fresh carbide, and nitrogen being introduced into the reaction chamber at one end and the finished nitrogen compound product being removed from the chamber at the other end.

This generally defines the nature of the operation, and I have found that the process may be carried out in a wide variety of different forms of apparatus. In the accompanying drawing, however, I have illustrated one form of apparatus which is suitable and which in practice I have found efficient for the purpose.

In the drawing 3 designates generally and diagrammatically a crusher, which may be of the usual or any ordinary form, for crushing carbide into powdered form. From the crusher the powdered carbide is introduced through a pipe 4, and out of contact with the air, into a bin or receptacle 5. In practice I find it preferable to exclude air from the receptacle 5. One method of accomplishing this result is to supply dried nitrogen gas to said receptacle, as, for example, through pipe 6 under just sufficient pressure to exclude air from said receptacle. I do not desire, however, to be limited or restricted in this respect, as obviously the bin could also be closed at the top by a suitable cover or the like. Located within the bin or receptacle 5 is a stirring device 7 operated by means of a pulley 8, or otherwise, from any convenient source of power. By the action of the stirrer the powdered carbide is maintained at a uniform and constant level within the bin or receptacle 5. The powdered carbide is delivered from the bin or receptacle 5 into a reaction chamber 9 in any suitable or convenient manner. A simple arrangement is shown wherein a screw conveyor indicated at 10, and driven by means of pulleys 11, or otherwise, from any convenient source of power, is employed to deliver the powdered carbide into the upper end of the reaction chamber 9. A distributor 12 driven by means of a pulley or other connection 13 from a convenient source of power operates to evenly distribute the powdered carbide within the reaction chamber 9. Nitrogen gas is also supplied to the reaction chamber through a supply pipe connection 14, along with the powdered carbide, or, if preferred, the nitrogen gas may be delivered directly into the reaction chamber through a supply pipe connection indicated in dotted lines at 15. The walls of the reaction chamber indicated at 16 are preferably constructed of refractory material and of sufficient thickness to prevent the radiation therefrom of the heat generated within the reaction chamber by the chemical action or reaction of the carbide and nitrogen gas. If desired, and preferably, and for further protection against heat radiation, the reaction chamber may be lined exteriorly by sheet metal plates 17. The reaction chamber is closed at the top, the carbide and nitrogen gas being introduced as above explained, through such closed top. Depending from the lower open end of the reaction chamber is a portion 18, preferably, though not necessarily, constructed of sheet steel, through which the nitrogen compounds produced are progressed, the lower end of the extension 18 being freely open. Disposed below the open end of the extension 18 are delivery rollers 19 having spiked teeth and suitably driven, for instance, through pulleys 20 from a convenient source of power. These rollers serve not only to support the column of nitrogen compound indicated at 21 but also to deliver the same as the continuous operation of the apparatus proceeds.

Located beneath the delivery rollers 19 I have shown a car 22 to receive the nitrogen compound for removal.

It will be observed that the extension 18 is not enclosed or surrounded and therefore is subjected to the cooling action of the outer air. The reaction chamber 9, as well as the extension 18, may be supported in any suitable or convenient manner, and I have shown supporting means 23 for this purpose. In like manner the receiving bin or hopper 5 may be conveniently supported upon beams 24 and extensions 25 formed on the sides of the hopper.

If desired, suitable peep holes 26 may be formed through the wall of the upper portion of the reaction chamber, so that the condition within such chamber may be observed. In like manner a pyrometer conventionally indicated at 27 may be inserted into the reaction chamber to indicate the degree of heat therein.

In the use of the apparatus above described, and in carrying out the process of my invention, and in order to initiate the reaction within the reaction chamber, I employ a temporary support indicated at 28, which may be retained in place in any suitable or convenient manner, preferably by stacking up a pile of supporting bricks beneath the same within the extension 18. The pulverized material is then charged into the chamber 9 and upon the temporary support and ignited thereon. As the proper degree of heat is attained additional raw material is distributed evenly into the reaction chamber, thereby initiating, with the introduction of nitrogen gas into the chamber, the chemical reaction resulting from the nitrogen being absorbed by the carbid. As the reaction proceeds and as the supply of carbid continues the preliminary ignition which is supported by air reaching the mass through the open lower end of the extension 18, or oxygen supplied in the same manner, the supply of oxygen and air is arrested so that thereafter the action proceeds continuously. As the nitrogen compound is formed the temporary supports for the plate or member 28 are removed from the bottom permitting the plate or member 28 to gradually descend through the extension 18. This action continues until eventually the plate or member 28 reaches the lower open end of the extension 18 when said plate or member is removed and the mass 21 of nitrogen compound product will rest upon the feed rollers 19 through the action of which the mass of product is broken up and delivered into the receiving receptacle 22. Obviously rollers 19 may be lengthened or increased so as to fully cover the size of the descending and cooling stack 21, and car 22 may be likewise of such size as to receive the disintegrated and cooled nitrogen compound.

As the action proceeds the nitrogen gas introduced into the reaction chamber is vigorously absorbed in the bed of material for a depth of several inches beneath the upper surface of such bed, this depth of bed constituting the reaction zone. Within this zone intense heat is produced which is transmitted to the carbide fed in from the bin 5, which absorbs the nitrogen gas gradually. In this manner the reaction is promoted upwardly and continuously due to the continuous supply and even distribution of fresh carbide material. The temperature of the carbide as supplied and also that of the nitrogen gas and the nitrogen chamber, that is, the space above the mass of material in the reaction chamber, should be far below that of the reaction zone. The heat generated in the reaction zone, after the action is initiated, is due solely to the chemical reaction which takes place and does not require the use of electrical or other means of external heat such as ordinarily employed in the processes now in general use. The result of the chemical reaction is the production of heat and the formation of cyanamides or other nitrogen compounds. The reaction temperatures vary with the quality and nature of the carbide employed and of the nitrogen gas. I have found that a suitable reaction temperature lies within the range of 800° C. and 1200° C. In practice I have found that a temperature of 1150° C. secures excellent results employing ordinary commercial carbide. Theoretically the greater the pressure maintained during the reaction the quicker is the reaction completed, but the difficulty arising from leakage of pressure renders the use of pressure within the reaction chamber impractical for actual operation. I therefore find it unnecessary to employ any greater pressure in the reaction chamber than such as may be sufficient to insure the proper delivery of nitrogen gas into the reaction chamber. The pressure of two or three inches of water is sufficient for this purpose. The speed of reaction varies according to the quality of the carbide raw material employed and of the nitrogen gas, and, to some extent, upon the pressure maintained in the reaction chamber, and generally, the speed of reaction controls the quantity and quality of the nitrogen compound product obtained. I have found a suitable speed of reaction sufficient when within a period of twenty-four hours a cyanamide product is obtained equal in quantity to a length of two and one-half to three feet of the column of such product issued or delivered from the extension 18 of the apparatus.

In initially starting the reaction within the reaction chamber the nitrogen gas is not introduced until after the temperature of the furnace due to the ignition of the carbide with the aid of air or oxygen has reached the desired degree. When this temperature is reached the ignition of the mass with air or oxygen is arrested and nitrogen is introduced into the nitrogen chamber or space above the ignited mass. Thereupon a chemical reaction takes place, the heat of which is sufficient to maintain the reaction. The reaction continues resulting in the formation of the desired nitrogen compound, cyanamides, for example, additional quantities of the raw material, pulverized carbide, for example, being admitted at the top of the reaction chamber and being evenly distributed over the surface of the mass contained within the reaction chamber. By continuously removing increments of the formed nitrogen compounds from the bottom of the mass and continuously applying and equally distributing fresh quantities of pulverized carbide upon and over the upper surface of the mass with continuous supply of nitrogen gas to the reaction chamber, the operation is carried on with speed, economy and efficiency, the heat generated from the chemical reaction which takes place being sufficient without requiring the use of application of external heat. The refractory lining of the reaction chamber serves to prevent sufficiently heat radiation. As the mass of formed nitrogen compounds, for example, cyanamides, progresses through the extension 18 which is not enclosed in a refractory or other cooling jacket or lining, it becomes sufficiently cooled so that when it eventually emerges from the open end of the extension 18 and gains access to the outer air it will not become oxidized, decomposed nor ignited.

The zone within the mass of material under treatment within which the reaction is carried on ordinarily extends to a depth of several inches beneath the upper surface of the mass, the chemical combinations being completed as the mass progresses through this reaction zone. Ordinarily the fresh quantities of pulverized carbide added to the upper surface of the mass in successive layers encounter the greatest degree of heat and consequently the combination therewith of the nitrogen gas supplied to the reaction chamber proceeds with great vigor and activity. As the pulverized carbide is supplied over the entire surface of the mass within the reaction chamber in evenly distributed layers throughout, the heat of chemical combination is generated uniformly throughout the entire mass thereby resulting in the production of cyanamides of uniform quality avoiding the objection of decomposition due to lack of uniformity of heat throughout the body of the mass, such for example, as overheating in some parts of the mass and underheating in other parts thereof.

Ordinarily the nitrogen gas employed should preferably be in a pure state although due to the uniformity of action resulting from equal distribution of the carbides, cyanamides and other nitrogen compounds of excellent quality are secured even when the nitrogen is not entirely purified or even by-product nitrogen produced at low cost, such for example, as the exhaust gas from the lead chamber of sulphuric acid plants is employed.

Because little or no labor is required and because of the extreme simplicity of the process and apparatus employed nitrogen compounds may be produced at exceedingly small cost.

Having now set forth the objects and nature of my invention and a form of means capable of carrying same into practical operation, what I claim as new and useful and of my own invention, and desire to secure by Letters Patent is,—

1. The process of making nitrogen compounds which consists in igniting a mass of raw materials to initiate the operation, then arresting the ignition and supplying nitrogen gas to the mass to start a chemical reaction and supplying fresh quantities of raw material to maintain the chemical reaction, and finally removing the formed nitrogen compounds from the bottom of the mass while continuing to supply nitrogen gas and fresh raw material to the top of the mass.

2. The process of making nitrogen compounds from carbides which consists in igniting a mass of pulverized carbides, then arresting the ignition and supplying nitrogen gas to the ignited mass to initiate the chemical combination and evenly distributing fresh quantities of pulverized carbide over the upper surface of the mass to maintain the chemical combinations and removing the formed cyanamides from the bottom of the mass.

3. The process of making nitrogen compounds from carbides which consists in igniting a mass of pulverized carbide contained in a reaction chamber, then arresting the ignition and supplying nitrogen gas to the heated mass to inaugurate chemical reaction in the mass to produce cyanamides under the influence of the heat of such reaction, and progressing the formed cyanamides through the chamber and supplying fresh quantities of pulverized carbide to the mass.

4. The process of making nitrogen compounds from carbides which consists in igniting a mass of pulverized carbide in the presence of an oxygen-containing atmosphere to a desired temperature, then replacing the oxygen-containing atmosphere by an atmosphere of nitrogen and continuously feeding fresh supplies of carbide and nitrogen to thereby form the nitrogen compounds.

5. The process of making nitrogen compounds from carbides which consists in pulverizing the carbide, feeding said carbide continuously to a reaction chamber, then causing an ignition in said chamber in the presence of an atmosphere containing oxygen to obtain a temperature of approximately 1150° C., thereafter replacing the said atmosphere by an atmosphere of nitrogen to set up a reaction between the carbide and nitrogen and continuously feeding fresh materials into said reaction chamber to thereby form the nitrogen compounds.

6. A furnace for manufacturing nitrogen compounds consisting of a reaction chamber having its lower end open, means to temporarily support a mass of raw material within such chamber, means for supplying nitrogen gas and fresh quantities of raw material through the upper end of said chamber, said temporary support being gradually withdrawn to permit the body of formed nitrogen compounds to progress through the open end of such chamber.

7. In a furnace for the manufacture of nitrogen compounds, a reaction chamber having its lower end open, delivery devices disposed below the open end of such chamber, means for continuously supplying nitrogen gas and fresh quantities of the raw material to be treated through the upper end of said chamber, and means to conserve heat and to promote the chemical combination of the raw material and nitrogen gas within said chamber.

8. In a furnace for the manufacture of nitrogen compounds, a reaction chamber having an extension, delivery devices disposed below said extension, a receiving hopper for the raw material to be treated, means to continuously deliver the raw material from said hopper, means to evenly distribute the same within said chamber, means for supplying nitrogen gas to said chamber, and means to conserve heat and to promote the chemical combination of the nitrogen and raw material.

9. In a furnace for the manufacture of nitrogen compounds, a reaction chamber having an extension, delivery devices disposed below said extension, a receiving hopper for raw material to be treated, means for continuously delivering the raw material from said hopper, means to regulate the distribution of said material within the reaction chamber, means for supplying nitrogen gas to said chamber and means to progressively and continuously promote the chemical combination of the nitrogen and the raw material.

10. In a furnace for the manufacture of nitrogen compounds, a reaction chamber having an extension, delivery devices disposed below said extension, a receiving hopper for the raw material to be treated, means for steadily delivering raw material to said chamber, means for evenly distributing the material in the chamber, means for supplying nitrogen gas to said chamber, means for conserving reaction temperature for combining the nitrogen and raw material, and means for promoting the cooling of said material after leaving the reaction chamber.

11. A furnace for the manufacture of nitrogen compounds, comprising a heat insulated reaction chamber superimposed and integrally united with a heat radiating cooling chamber of greater length than the reaction chamber, said reaction chamber being closed to the excess of the outer atmosphere when the furnace is in operation and said heat radiating chamber being freely open ended to the outer atmosphere.

In testimony whereof I have hereunto set my hand on this 2nd day of December, A. D., 1918.

TSUNEICHI FUJIYAMA.